DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 1, 1973

910 O.G. 7

T910,003
PAINT REMOVER COMPOSITIONS
Eugene D. Klug, Wilmington, Del., assignor to Hercules Incorporated, Wilmington, Del.
Filed May 26, 1972, Ser. No. 257,364
Int. Cl. C09d *9/00*
U.S. Cl. 252—171
No Drawing. 8 Pages Specification

Improved paint removers are prepared based on chlorinated aliphatic hydrocarbon solvents thickened by means of a crosslinked allyl-hydroxyalkyl cellulose derivative. Crosslinking of the cellulose derivative is preferably effected by a nitrile N-oxide. Other more conventional crosslinking methods and materials are also effective. The disclosed paint removers are effective on substantially any conventional type of paint, varnish, shellac or the like in either scrape-off or flush-off formulations.